J. J. MERRILL.
APPARATUS FOR DRYING STARCH.
APPLICATION FILED OCT. 12, 1914.
1,183,097.
Patented May 16, 1916.
3 SHEETS—SHEET 1.
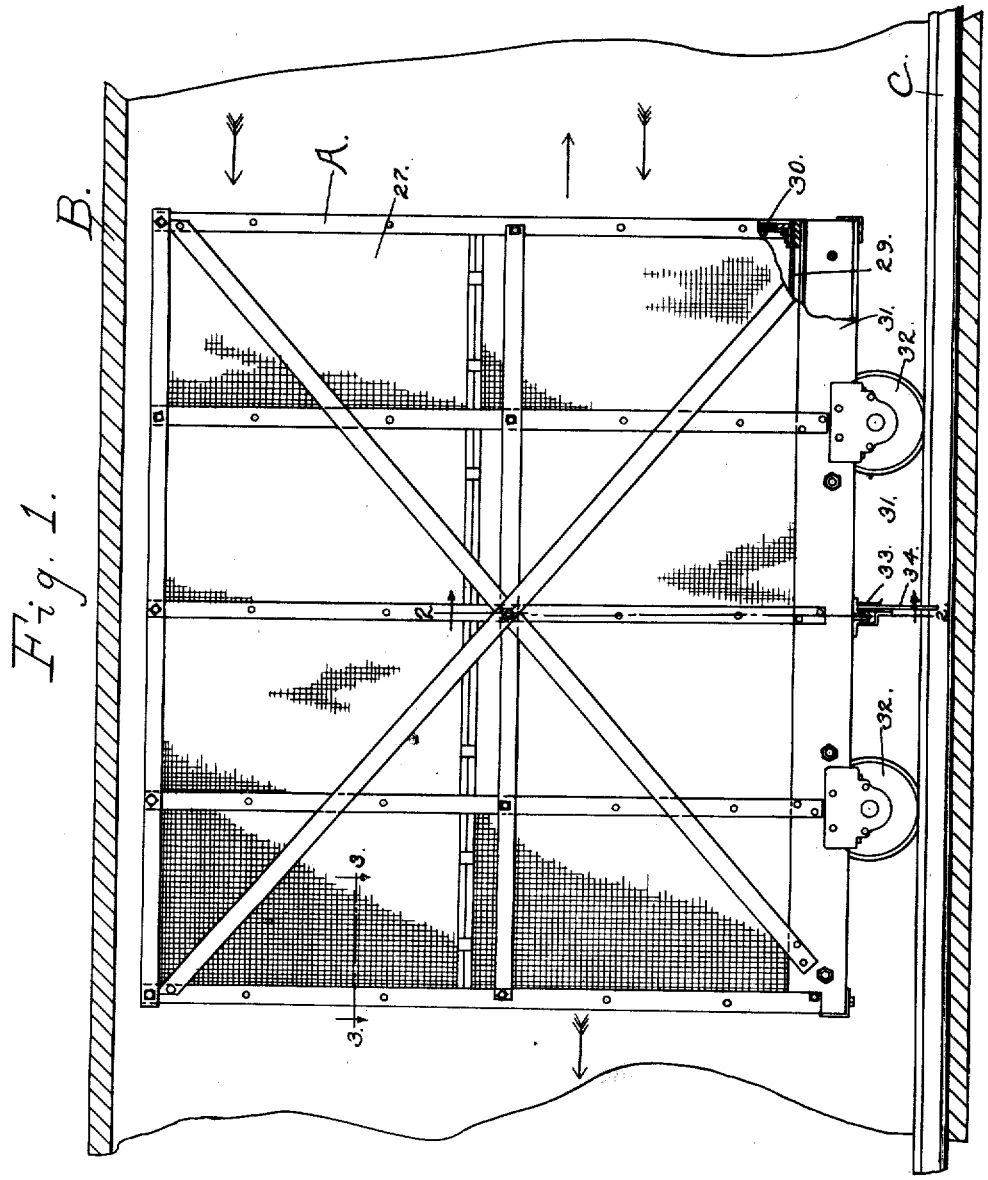
WITNESSES:
H. M. Gillespie
J. B. Lagorio Jr.
INVENTOR.
Joseph J. Merrill
BY Barnett Truman
ATTORNEYS.

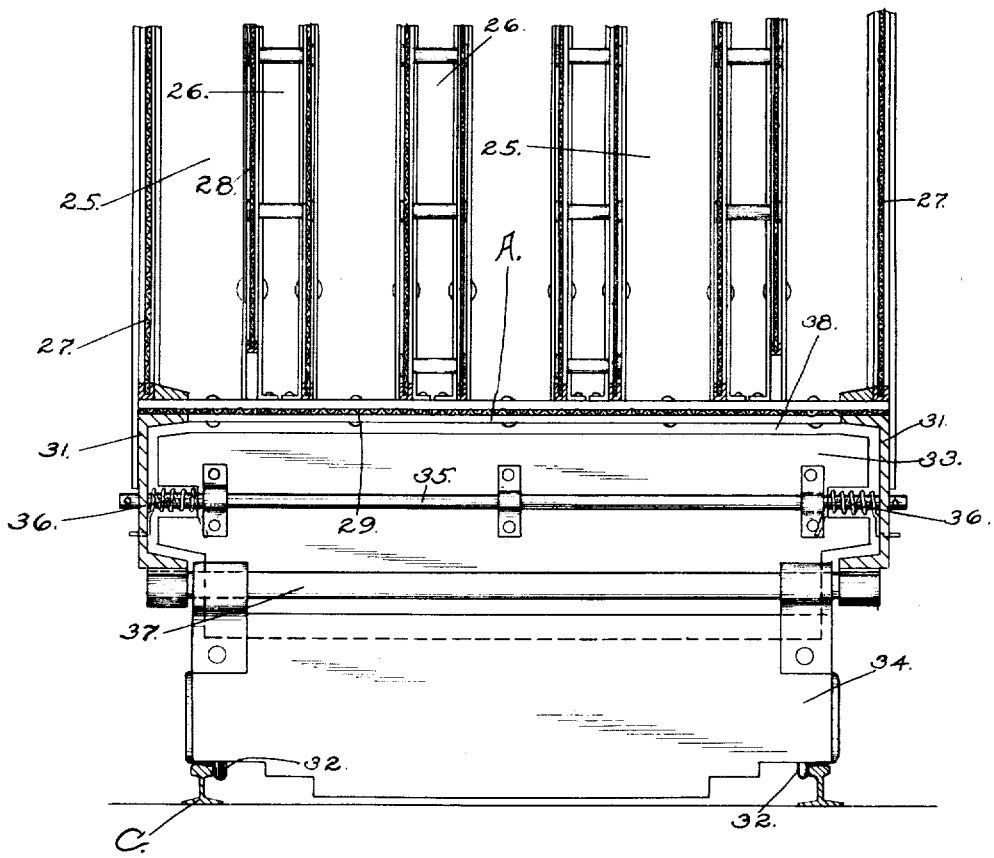
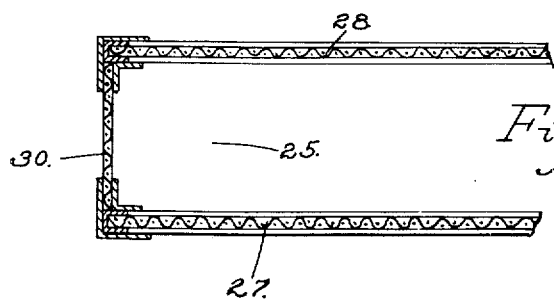

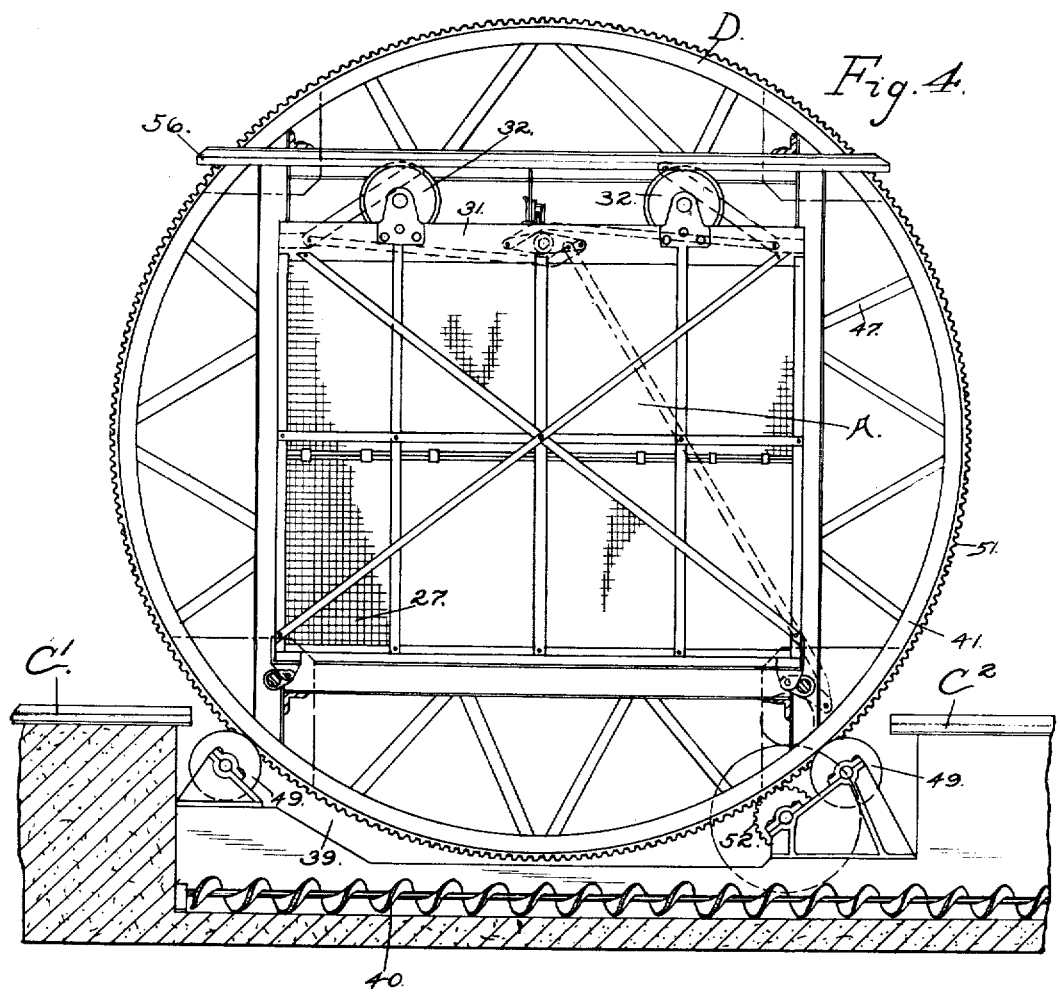

UNITED STATES PATENT OFFICE.

JOSEPH J. MERRILL, OF CHICAGO, ILLINOIS, ASSIGNOR TO CORN PRODUCTS REFINING COMPANY, A CORPORATION OF NEW JERSEY.

APPARATUS FOR DRYING STARCH.

1,183,097.  Specification of Letters Patent.  Patented May 16, 1916.

Application filed October 12, 1914. Serial No. 866,324.

*To all whom it may concern:*

Be it known that I, JOSEPH J. MERRILL, a citizen of the United States, residing at Chicago, in the county of Cook and State of Illinois, have invented certain new and useful Improvements in Apparatus for Drying Starch, of which the following is a specification.

My invention relates to the operation of drying starch after it has been removed from the starch tables, and the principal object of the invention is to provide certain improvements in the means for accomplishing this operation disclosed in the patent granted to Louis P. Bauer August 13, 1912, No. 1,035,302, for "Method of drying starch" and in the apparatus for carrying out said process shown and described in said patent. In carrying out the method described in the Bauer patent the starch, after being stripped from the tables and broken up into lumps of suitable size, is fed into narrow longitudinal starch compartments which are arranged in spaced relation in the wagon and extend from top to bottom thereof and are formed with foraminous sides. The wagons are then moved slowly through a drying tunnel or tunnels against a draft of hot air which is forced constantly through the tunnels in the direction opposite to that of the travel of the wagons. In the apparatus first constructed for carrying out this process the wagons were provided with imperforate bottom leaves or valves which served to close the compartments at the bottom and which were arranged so as to be capable of being withdrawn to permit the discharge of the starch after it had been dried. It was found, however, that when wagons of this sort were used the starch in the bottom of the compartments was not always properly dried. Starch, as it comes from the settling tables, is an extremely difficult substance to handle. It containes approximately fifty per cent of moisture and is heavy and sticky. As a result it was found to have a tendency to pack or clog in the bottom of the starch wagon so that besides failing to be dried properly the starch in the lower portions of the compartments, under some conditions, not always easily avoidable, instead of drying was, in a sense, cooked and discolored. This, besides impairing the uniformity of the product and making a separation between the properly dried and defectively dried starch a necessity, interfered with the discharge of the starch from the bottom of the compartments when the bottom sheets or valves were withdrawn. I have found that these difficulties may be remedied and the method described in the Bauer patent improved by supporting the lower ends of the starch bodies on a foraminous support, for example, by making the bottoms of the wagons of a heavy wire mesh. This allows the extraction of moisture from the lower portions of the starch bodies to take place freely and prevents the discoloration of the starch and, to a large extent, the tendency to clog. This change in the construction of the wagon, however, necessitates a different method of discharging the dried starch therefrom as it is not feasible to construct wagons with removable leaves or valves of wire mesh. I have, therefore, devised the expedient of inverting the wagons after they come from the starch tunnels and dumping their contents out from the top. The starch moves more freely in this direction since any packing due to gravity has taken place by forces operating in the opposite direction. Moreover, if there should be any sticking of the starch in the extreme lower portions of the compartments this circumstance does not affect the free discharge of the bulk of the dried starch in the compartments.

A suitable apparatus embodying the aforementioned improvements is disclosed in the accompanying drawings wherein—

Figure 1 is a side elevation of a starch wagon constructed in accordance with my invention, shown as in place in the drying tunnel, a portion of which is illustrated in cross section. Fig. 2 is a sectional view of the lower portion of the wagon taken on line 2—2 of Fig. 1. Fig. 3 is a detail sectional plan on line 3—3 of Fig. 1; Fig. 4 is an elevation of an apparatus suitable for discharging the starch from the starch wagon of my invention.

Like characters of reference designate like parts in the several figures of the drawings.

Referring to the drawings, A designates a starch wagon, B the drying tunnels through which the wagon is moved in the direction indicated by the unfeathered arrows and through which hot air is forced in the direction indicated by the feathered arrows.

C is a track extending through the tunnel; $C^1$, $C^2$, a continuation of this track extending beyond the tunnel at the discharge end thereof; and D is the tipple for discharging the dried starch from the starch wagons. The starch wagons are formed, in each case, with a plurality of compartments 25 which are comparatively narrow, extend from top to bottom of the wagon and preferably from end to end thereof, and are open at the top. The compartments are spaced apart so that a narrow passageway 26, for the circulation of air, intervenes between each compartment and the adjacent compartment. The side 27 of the wagon and the interior partitions 28 are foraminous, consisting preferably of wire mesh. The compartments are closed at the bottom by a sheet of wire mesh 29 which extends across the wagon from side to side and lengthwise from end to end. The starch, when filled in the compartments 25, rests upon this wire mesh bottom 29. The ends of the compartments are separately closed by strips of wire mesh 30.

The superstructure built as above described, is mounted upon suitable running gear consisting, in the form of wagon shown in the drawings, of a supporting frame 31 and wheels 32. In order to prevent the hot air from short circuiting under the wagons instead of going through the air passage 26, the wagon is provided with a pair of transversely arranged baffle plates 33, 34, the upper plate 33 being pivotally mounted on the frame 31 by means of a shaft 35 and pressed against the lower plate 34, which it overlaps, by springs 36. The lower plate is carried on a shaft 37 pivoted to the under side of the frame 31. A narrow space 38 intervenes between the upper edge of the baffle plate 33 and the foraminous bottom 29 of the wagon so that hot air is directed along the under side of the wagon in contact with the lower edges of the bodies of starch in the starch compartments.

The tipple D is arranged over a hopper 39 in the bottom of which is a screw conveyer 40, or other suitable device, for conveying the starch to any convenient point in the factory for shipment or further treatment; the hopper 39 intervening between the sections of track $C^1$, $C^2$. The tipple may be of any suitable construction, the purpose of the device being to invert the starch wagons so as to discharge the dried starch from the open ends of the starch compartments. I have shown a familiar type of tipple consisting of a circular structure D having bearing rings 41 supported on rollers 49 and provided with a gear wheel 51 meshed by a driving pinion 52 to which power is supplied in any suitable manner. The tipple carries rail sections 56 which aline with the rail sections $C^1$, $C^2$ on which the starch wagon is run. The wagon is clamped to the tipple in any suitable manner and the tipple then revolved one hundred and eighty degrees to the position shown in Fig. 4. The starch is delivered into the pit or hopper 39 and removed therefrom by conveyer 40.

During the drying operation the starch shrinks considerably and for that reason it is possible to discharge it from the comparatively narrow starch compartments. However, the movement of the wagon through the tunnel and to the place of discharge is likely to jar the wagons enough to cause the starch to pack a little in the bottom of the compartments even when the drying is uniform throughout. If, as may happen, the starch in the lower portions of the compartments, due to the somewhat greater density, is not quite as dry as the rest of it, the tendency to stick is necessarily enhanced. The inversion of the wagon tends to shake the starch loose from the foraminous sides and bottom and, furthermore, the starch will discharge more readily from the top of the compartments than from the bottom since with the wagon in inverted position the tendency to clog, if any there be, is at the top and not at the bottom of the mass. Once the bodies of starch have started to move they are likely to discharge completely. The difficulty with the former method of discharging the starch from the bottom of the compartments was that even a slight clogging in the bottom of the compartments would prevent the necessary initial movement.

While I have shown the preferred form of tipple for inverting and dumping the wagons my invention is not confined to this construction. Any suitable means might be used for grappling the wagons and turning them up side down.

I claim:

In apparatus for drying starch the combination with a drying tunnel, of a starch wagon comprising a plurality of narrow compartments extending longitudinally of the wagon and from top to bottom thereof, spaced apart to provide longitudinal circulation spaces, and formed with foraminous sides, a foraminous bottom support for the lower edges of the bodies of starch in said starch compartments which is permanently affixed to the wagon, and a running gear which supports said compartments spaced away from the floor of the tunnel; said starch compartments being open only at the top wherefore the wagon must be inverted in order to discharge the dried starch.

JOSEPH J. MERRILL.

Witnesses:
J. W. PFEIFFER,
H. W. STUKE.

It is hereby certified that in Letters Patent No. 1,183,097, granted May 16, 1916, upon the application of Joseph J. Merrill, of Chicago, Illinois, for an improvement in "Apparatus for Drying Starch," an error appears in the printed specification requiring correction as follows: Page 1, lines 16–18, strike out the words "and in the apparatus for carrying out said process shown and described in said patent;" and that the said Letters Patent should be read with this correction therein that the same may conform to the record of the case in the Patent Office.

Signed and sealed this 25th day of July, A. D., 1916.

[SEAL.]

F. W. H. CLAY,

*Acting Commissioner of Patents.*

Cl. 34—46.